(No Model.)

J. K. CUMMINGS.
COFFEE POT.

No. 544,963. Patented Aug. 20, 1895.

Witnesses:
Geo. E. Frech.
James W. Bevard

Inventor.
James K. Cummings
By Pattison & Nesbit
Attorneys.

UNITED STATES PATENT OFFICE.

JAMES K. CUMMINGS, OF LADONIA, TEXAS.

COFFEE-POT.

SPECIFICATION forming part of Letters Patent No. 544,963, dated August 20, 1895.

Application filed May 13, 1895. Serial No. 549,147. (No model.)

*To all whom it may concern:*

Be it known that I, JAMES K. CUMMINGS, of Ladonia, in the county of Fannin and State of Texas, have invented certain new and useful Improvements in Coffee-Pots; and I do hereby declare the following to be a full, clear, and exact description of the invention, such as will enable others skilled in the art to which it pertains to make and use the same, reference being had to the accompanying drawings, which form part of this specification.

My invention relates to improvements in coffee-pots, and has for its object the provision of an improved coffee-grounds holder, together with a device of improved form for spraying the water thereover, the latter device operating in conjunction with a condenser; and a further object is to provide the pot with an adjustable handle.

With these objects in view my invention consists in the novel features of construction hereinafter fully described and claimed, and illustrated by the accompanying drawings, in which—

Figure 1:
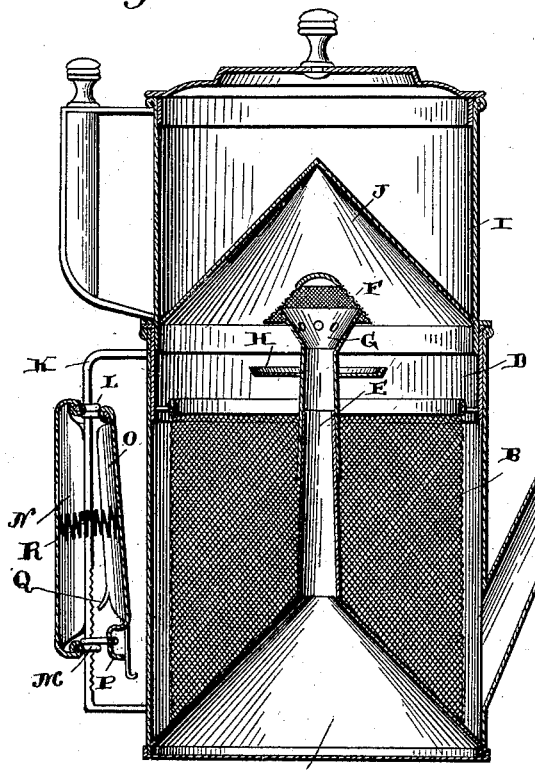
Figure 2:
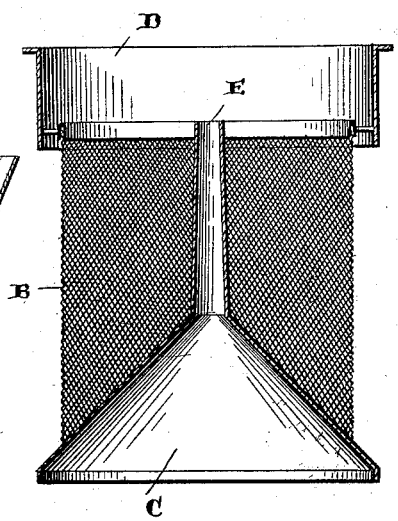
Figure 3:
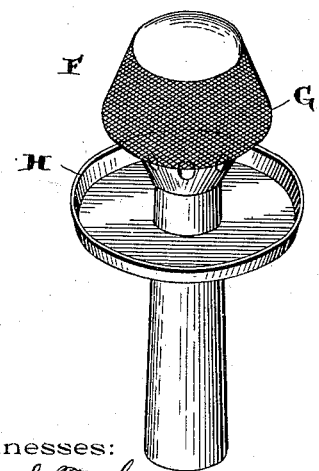
Figure 4:
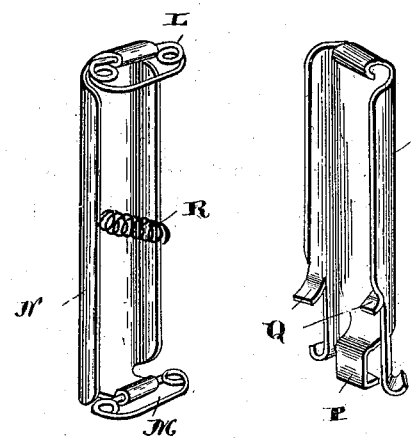

Figure 1 is a vertical sectional view of my improved coffee-pot. Fig. 2 is a similar view of the strainer mechanism removed from the pot. Fig. 3 is a detail view of the sprayer. Fig. 4 is a similar view of the adjustable handle.

A is a pot of ordinary construction, and B the perforated grounds holder and strainer provided with a funnel-shaped bottom C, fitting snugly within the pot, as shown in Fig. 1. The perforated holder is of less diameter than the pot and is provided upon its upper end with the flanged collar D, of larger diameter, which fits within the upper end of the pot, the flange hanging thereover, as shown. The funnel-spout E extends nearly to the top of holder B, and adapted to fit thereon is sprayer F, the latter consisting of the enlarged perforated head G, having arranged beneath the same the annular deflector H. By means of this arrangement when the water within the pot boils and rises, together with the steam, to the funnel it will discharge through the perforated head and be sprayed over the grounds within the container B by means of the devices just referred to.

For the purpose of making more rapid the condensation of the steam I provide vessel I, fitting within the upper end of the pot and provided with the cone-shaped bottom J, which is adapted to collect into a small space—that is, in its apex—the steam rising through the sprayer, and then when the water is in a boiling condition cold water is placed within chamber I and rapidly condenses the steam beneath its funnel-shaped bottom, causing the product of condensation to drip upon the grounds, and thus secure all the strength therefrom.

For supporting the handle I provide the two rods K, arranged vertically and supported in an outwardly-extended position from the pot, and upon these rods are adapted to slide the wire heads L and M. To the outer sides of the heads is secured the handle-section N, the same being secured positively, while to inner side of the upper head L is loosely secured the inner handle-section O, its lower end depending adjacent head M and provided with the inwardly-bent hooked tongue P for passing around the inner bar of head M. On each side of the lower end of section O are the inwardly-bent biting-edges Q, adapted to engage the serrations in rod K, and thus hold the handle in the desired vertical position upon the rods, the heads L and M being slidable thereon, as will be readily understood. Coiled spring R is arranged between the handle-sections and serves to hold the inner section away from the rods, so as to be movable freely thereon, excepting when grasped by the hand. Thus when the pot is well filled the handle will be adjusted to the upper portion of the rods K, while when nearly empty it may be conveniently slid down, and thus the pot may be poured from with little or no disturbance.

Having thus fully described my invention, what I claim as new, and desire to secure by Letters Patent, is—

1. The combination of the pot, the coffee container having the surrounding perforated wall reaching nearly to the bottom of the pot, the raised cone-shaped bottom for the receptacle which extends well up therein, the tube extended upward from the apex of the cone bottom, and the enlarged perforated spraying head or bonnet on the upper end of the tube, substantially as shown and described.

2. The combination of a coffee pot, rods K arranged vertically thereon, a sectional handle adapted to slide vertically thereon, and a means for securing the handle to the rods, substantially as shown and described.

3. The combination of a vertical guideway, a handle consisting of a fixed outer member, an inner member pivoted at one end and provided with biting edges upon its inner side to engage the guide-way when depressed by the hand so as to hold the handle in a fixed position upon the guide-way, and a spring for normally separating the sections of the handle, substantially as shown and described.

4. The combination with a coffee pot, of guide-ways K, heads L and M, the outer section of the handle positively secured to said head, the inner section pivotally secured to the upper head, an inwardly extending hook on the lower end of the swinging section which engages the lower head, biting edges on the said lower end adapted to engage rods K and hold the handle in a positive position when grasped, and a spring for holding the sections normally apart, substantially as shown and described.

In testimony whereof I affix my signature in presence of two witnesses.

JAMES K. CUMMINGS.

Witnesses:
J. D. FRALEY,
R. A. DUNCAN.